(12) United States Patent
Handley (10) Patent No.: US 7,734,636 B2
(45) Date of Patent: Jun. 8, 2010

(54) SYSTEMS AND METHODS FOR ELECTRONIC DOCUMENT GENRE CLASSIFICATION USING DOCUMENT GRAMMARS

(75) Inventor: John C. Handley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1322 days.

(21) Appl. No.: 11/094,415

(22) Filed: Mar. 31, 2005

(65) Prior Publication Data

US 2006/0230004 A1    Oct. 12, 2006

(51) Int. Cl.
*G06F 17/30* (2006.01)

(52) U.S. Cl. .................. 707/755; 707/756; 707/811; 707/999.004; 707/999.107

(58) Field of Classification Search .............. 707/1, 707/4–5, 10, 100, 104.1, 755, 811, 999.004, 707/999.107; 704/1, 9; 709/203
See application file for complete search history.

(56) References Cited

U.S. PATENT DOCUMENTS

| | | | | |
|---|---|---|---|---|
| 5,760,382 A | * | 6/1998 | Li et al. .................. | 235/436 |
| 5,893,916 A | * | 4/1999 | Dooley .................. | 715/234 |
| 5,937,084 A | * | 8/1999 | Crabtree et al. .......... | 382/137 |
| 5,999,664 A | * | 12/1999 | Mahoney et al. .......... | 382/305 |
| 6,029,171 A | * | 2/2000 | Smiga et al. ............. | 707/102 |
| 6,038,541 A | * | 3/2000 | Tokuda et al. ............ | 705/8 |
| 6,061,478 A | * | 5/2000 | Kanoh et al. ............. | 382/305 |
| 6,178,417 B1 | | 1/2001 | Syeda-Mahmood | |
| 6,226,658 B1 | * | 5/2001 | Smith ..................... | 715/207 |
| 6,311,214 B1 | * | 10/2001 | Rhoads .................... | 709/217 |
| 6,336,124 B1 | * | 1/2002 | Alam et al. .............. | 715/205 |
| 6,694,331 B2 | * | 2/2004 | Lee ....................... | 707/104.1 |
| 6,947,162 B2 | * | 9/2005 | Rosenberg et al. ........ | 358/1.15 |
| 7,433,517 B2 | * | 10/2008 | Kato et al. ............... | 382/180 |
| 2002/0143806 A1 | * | 10/2002 | Lee et al. ................ | 707/500 |
| 2004/0013302 A1 | * | 1/2004 | Ma et al. ................. | 382/209 |
| 2004/0247206 A1 | * | 12/2004 | Kaneda et al. ............ | 382/305 |
| 2005/0111745 A1 | * | 5/2005 | Kato et al. ............... | 382/243 |
| 2005/0289182 A1 | * | 12/2005 | Pandian et al. ........... | 707/104.1 |

* cited by examiner

*Primary Examiner*—Miranda Le
(74) *Attorney, Agent, or Firm*—MH2 Technology Law Group LLP (57) ABSTRACT

A system for classifying a genre of an electronic document may include a network processor configured to receive an electronic document and convert the electronic document to rich text format (RTF). The processor may be configured to parse the RTF document into lines of text ordered from top to bottom and left to right and assign tokens to each line of text based on content of the line and to line separators based on space between blocks of lines. The network processor may be configured to sequence the tokens, parse the tokenized document with a number of pre-defined document grammars, determine a probability for each genre corresponding to the electronic document, and classify the electronic document as the genre with the highest probability.

11 Claims, 5 Drawing Sheets

Mr. Craig Schub
Director of Development
PacifiCare Health Systems
5995 Plaza Drive
Cypress, CA 90630

Dear Craig:

Enclosed is one set of the new pages for the HMO National Network Sales Binder. As you can see, we have been busy expanding the Network to make it a better sales tool for your marketing representatives.

Please distribute these sets of materials to everyone at your HMO to whom you have given a Sales Binder.

We are working on a few more new pages that will be sent to you later this month. These pages are for Physicians Health Services of Connecticut and a map for ConnectiCare.

Please call me if you have any questions. I look forward to hearing from you and your sales/services reps.

Sincerely,

Ronald Rice
Executive Director

RR:hvy

Enclosures

FIG. 4

DATELINE
    May 16, 1991

INSIDE_ADDRESS
    Mr. Craig Schub
    Director of Development
    PacifiCare Health Systems
    5995 Plaze Drive
    Cypress, CA 90630

OPENING
    Dear Craig:

BODY_TEXT
    Enclosed is one set of the new pages for the HMO National Network Sales Binder. As you can see, we have been busy expanding the Network to make it a better sales tool for your marketing representatives.

BODY_TEXT
    Please distribute these sets of materials to everyone at your HMO to whom you have given a Sales Binder.

BODY_TEXT
    We are working on a few more new pages that will be sent to you later this month. These pages are for Physicians Health Services of Connecticut and a map for ConnectiCare.

BODY_TEXT
    Please call me if you have any questions. I look forward to hearing from you and your sales/services reps.

CLOSING
    Sincerely,

SIGNOR
    Ronald Rice
    Executive Director

TAG_LINE
    RR:hvy

TAG_LINE
                Enclosures

*FIG. 5*

SYSTEMS AND METHODS FOR ELECTRONIC DOCUMENT GENRE CLASSIFICATION USING DOCUMENT GRAMMARS

BACKGROUND

Conversion of paper documents to electronic form speeds and enhances many business processes. Business documents often contain identifying information that allows documents to be routed or stored properly and there is great value in extracting this information automatically from scanned document images.

Business processes in the office are facilitated by networks of computers and so-called multifunction devices. These devices incorporate printers, faxes, and scanners that, coupled with servers running the proper software, create functionality to convert paper documents to electronic and vice-versa. Furthermore, these networked devices can connect personal digital assistants, cell phones, and other handheld devices. It may be desirable to extract business information from documents in a networked environment to route, share, store, and/or display the information where it is most useful.

Owing to the expense of paper handling, many businesses, such as banks, law firms, and the like, seek to eliminate paper workflows by scanning mail and converting faxes to electronic form as soon as they are delivered to the mailroom and routing them electronically. This is faster and cheaper than using hardcopy.

Many of today's offices receive and distribute numerous types or genres of business documents each day. For instance, a typical office may receive and distribute business cards, business letters, memoranda, resumes, invoices, and the like.

Conventional document handling systems exist for scanning business documents, processing the scanned document, and storing the scanned document in a desired repository. Similarly, conventional systems exist for receiving a fax of a document as an electronic file, processing the electronic file, and routing the file to a desired location. Also, in conventional systems, an electronic document can be distributed as an attachment to an email, processed, and routed to a desired user or storage location.

These conventional systems are labor-intensive and prone to error. For example, these systems typically require a user to instruct the system as to the type of document being input and what type of routing or distribution of the processed document should be followed.

Therefore, it may be desirable to provide an electronic document genre classification system and method that is automated and substantially error free. Moreover, it may be desirable to provide an electronic document genre classification system that converts various types of business documents to a universal format, for example, a rich text format, so that the text of the documents can be parsed, tokenized, and sequenced. Furthermore, it may be desirable to provide an electronic document genre classification system that can determine the probabilities associated with parsing the processed electronic document with a number of predefined document grammars to classify the genre of the electronic document and route the document based on the determined genre.

SUMMARY

According to various aspects of the invention, a system for classifying a genre of an electronic document may include a network processor configured to receive an electronic document, convert the electronic document to rich text format (RTF), and parse the RTF document into lines of text ordered from top to bottom and left to right. The processor may also be configured to assign tokens to each line of text based on content of the line and to line separators based on space between blocks of lines, sequence the tokens, parse the tokenized document with a number of pre-defined document grammars, determine a probability for each genre corresponding to the electronic document, and classify the electronic document as the genre with the highest probability.

In accordance with various aspects of the invention, a method for classifying a genre of an electronic document may include receiving an electronic document, converting the electronic document to rich text format (RTF), and parsing the RTF document into lines of text ordered from top to bottom and left to right. The method may also include assigning tokens to each line of text based on the content the line and to line separators based on space between blocks of lines, sequencing the tokens, parsing the tokenized document with a number of pre-defined document grammars, and determining a probability for each genre corresponding to the electronic document, and classifying the electronic document as the genre with the highest probability.

According to various aspects of the invention, a method for classifying a genre of a document may include scanning a hardcopy document to generate an electronic document, converting the electronic document to rich text format (RTF) using optical character recognition technology, and parsing the RTF document into lines of text ordered from top to bottom and left to right. The method may also include assigning tokens to each line of text based on the content the line and to line separators based on space between blocks of lines, sequencing the tokens, parsing the tokenized document with a number of pre-defined document grammars, and determining a probability for each genre corresponding to the electronic document, and classifying the electronic document as the genre with the highest probability.

BRIEF DESCRIPTION OF THE DRAWINGS

The drawings are only for purposes of illustrating exemplary embodiments and are not to be construed as limiting, wherein.

DETAILED DESCRIPTION

For a general understanding, reference is made to the drawings. In the drawings, like reference numerals have been used throughout to designate identical or equivalent elements. It is also noted that the various drawings are not drawn to scale and that certain regions have been purposely drawn disproportionately so that the features and concepts could be properly illustrated.

Figure 1:
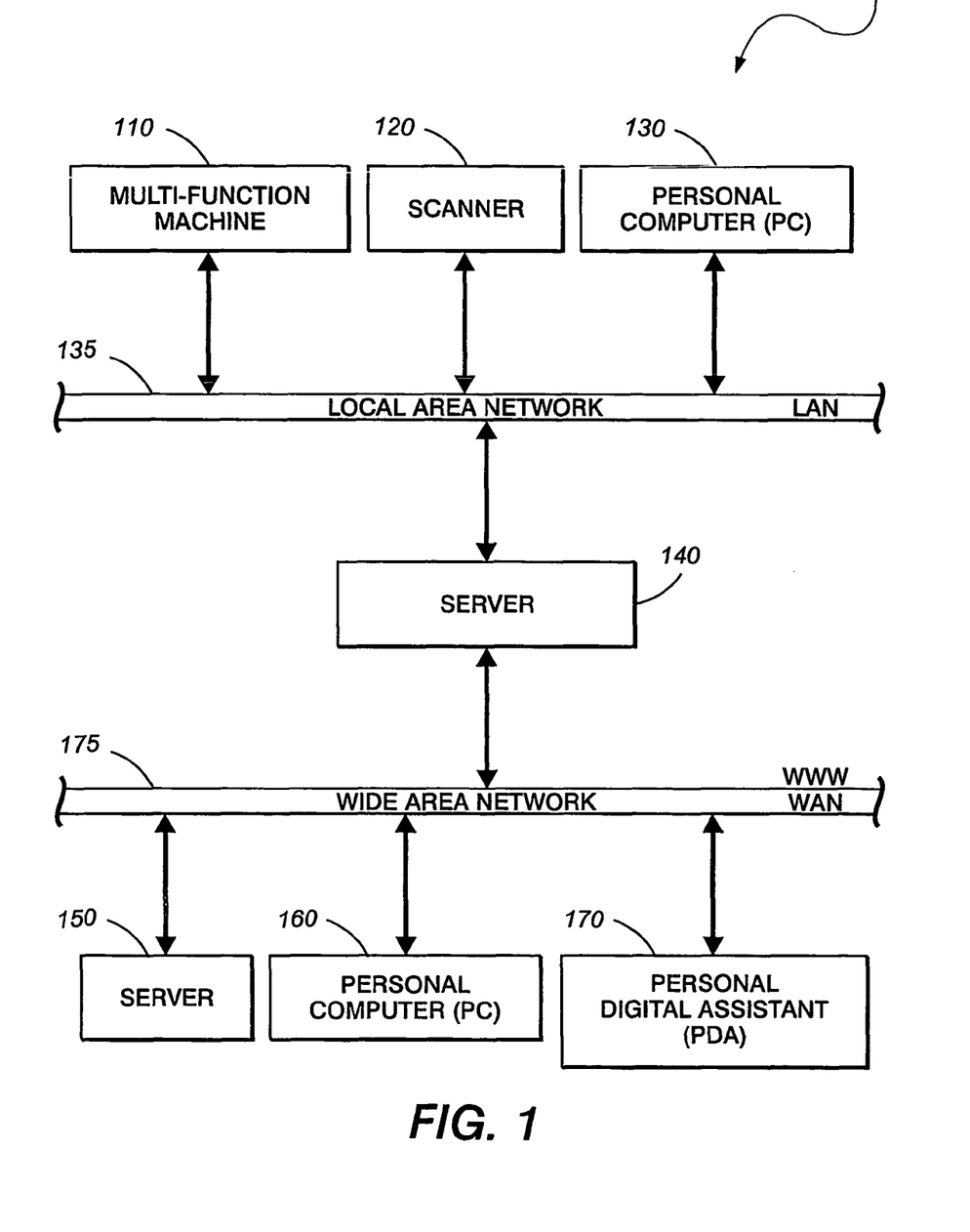
FIG. 1 is a block diagram of an exemplary system for electronic document genre classification.

Referring to FIG. 1, an exemplary system 100 for electronic document genre classification may comprise one or more multifunction machines 110, one or more digital scanners 120, and/or one or more personal computers 130 coupled with a network server 140 via a local area network 135. The network server 140 may include a processor configured to execute various processes according to various aspects of the invention. It should be appreciated that the processor may reside elsewhere on the system 100, if desired. The local area network 135 may be a wired network, a wireless network, or a combination thereof. The network server 140 may, in turn, be coupled with one or more servers 150, one or more personal computers 160, and/or one or more enabled personal digital assistants 170 (the personal digital assistant 170 may also be enabled through a personal computer) through a wide area network or world wide web 175. The wide area network 175 may be a wired network, a wireless network, or a combination thereof.

In operation, the system 100 can receive a business document in two formats, either as a hardcopy document or a rich text format document. Referring to FIG. 1, if the business document is a hardcopy document, the hardcopy document may scanned, by either a networked multifunction machine 110 having a digital scanner component or a networked digital scanner 120, to create a bitmap image thereof. Thereafter, a conventional optical character recognition routine is carried out by either the networked multifunction machine 110 (if the functionality resides on the networked multifunction machine 110), the networked digital scanner 120 (if the functionality resides on the networked digital scanner 120), a network server 140, or by a networked personal computer 130 (if the functionality resides on the networked personal computer 130). The conventional optical character recognition routine produces lines of text, position information, text size information, and line separators. It is noted that the networked multifunction machine 110, networked digital scanner 120, network server 140, and networked personal computer 130 may all be members of a local area network 135.

If the business document is an electronic document, the rich text format document may be generated by the networked personal computer 130. Thereafter, the rich text format document may be parsed by either the network server 140 or the networked personal computer 130 (if the functionality resides on the networked personal computer 130), to produce lines of text, position information, text size information, and/or line separators.

The remaining routines may be carried out by the network server 140 or networked personal computer 130 (if the functionality resides on the networked personal computer 130). The network server 140 may use the routing information distilled by the business document recognition system to forward or route the desired electronic documents to their appropriate destinations, such as a networked server 150, a networked personal computer 160, or a networked enabled personal digital assistant 170 (the personal digital assistant 170 may also be enabled through a personal computer) through a wide area network or world wide web 175 via, for example, a user account such as an email account.

Figure 2:
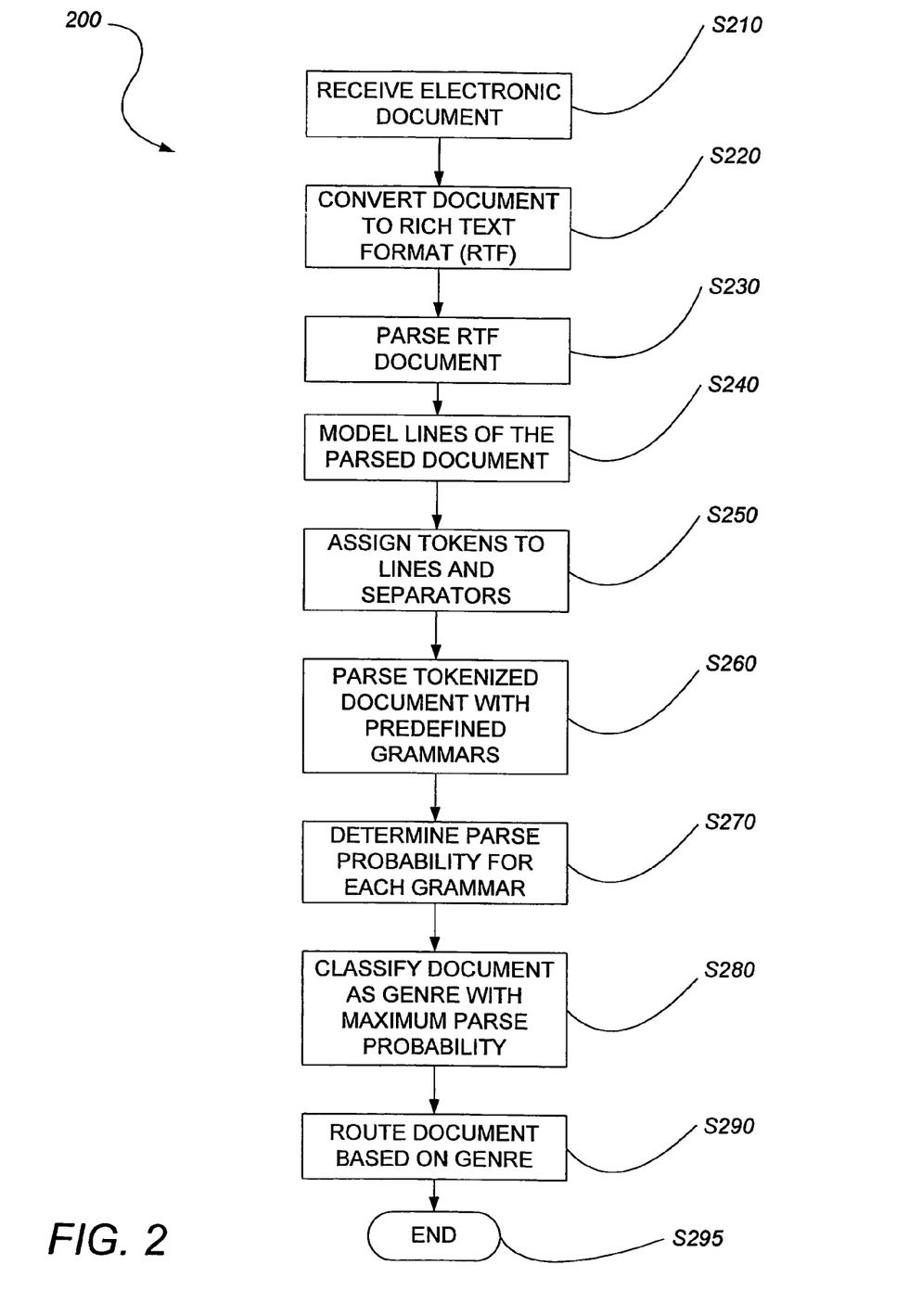
FIG. 2 is a flowchart illustrating an exemplary method for electronic document genre classification.

Referring now to FIG. 2, an exemplary method 200 for electronic document genre classification is described. The process begins at step S210, when a business document is received by the system 100. The business document may be input to the system 100 via a scan of a hardcopy document, a fax of a hardcopy document, or an electronic file, for example, a Word file, an Excel file, an Adobe file, etc. Control continues to step S220. Thereafter, in step S220, the document is converted into a rich text file format, which may include font size estimates. Control continues to step S230.

In step S230, the rich text file document is parsed to obtain lines of text, font size estimates, and/or line separators. The parser may group the lines in blocks of text, as appropriate. Control continues to step S240, where the lines of the parsed rich text file output are modeled as a linear sequence of text lines left-to-right, top-to-bottom. Control continues to step S250.

Then, in step S250, each line of text is tokenized using generalized regular expression matching, and a sequence of line tokens is generated. That is, each line is searched and assigned a label to identify the nature of the text data within the line. For example, a line of text may be tokenized as "name," "address," "salutation," "email," "fax," "phone number," "url," "alphabetic string," "alphanumeric string," etc. In addition, line separators between blocks of text may be tokenized. Control then continues to step S260.

In step S260, the sequence of line tokens is parsed with the grammars of a number of predefined document types or genres. For example, each predefined document type is associated with a list of tokens and a stochastic context-free grammar. For each document type, a general parser parses the sequence of line tokens with the list of tokens and probabilistic grammar for that document type, and determines the probability of parsing the received document with that document type. For example, a Cocke-Younger-Kasami (CYK) algorithm may be used with a stochastic grammar algorithm to find the most probable parse (derivation) of the sequence of terminals. The CYK algorithm determines whether a given string can be generated by a given stochastic context-free grammar and, if so, how it can be generated. This is known as parsing the string. An exemplary CYK algorithm is described below in more detail. The parse results in a labeling of the lines of text of the received document according to function. Control continues to step S270.

Next, in step S270, the parse probability for each grammar is determined. For example, the parse probabilities for a predefined business card grammar and a predefined business letter grammar may be determined the document type having the grammar that yields the maximum probability of parsing the received document is determined to be the document type of the received document. Control continues to step S280, where the parsed document is classified as the genre of the predefined document grammar that yields the maximum parse probability. Control then continues to step S290.

In step S290, the document is routed for appropriate processing based on the document type and/or information distilled from the document. For example, the document may be sent to a file repository for storage, to a network server or computing device for additional processing (e.g., a business card document may be converted to a format consistent with a conventional business card management application), to a user's personal computer or personal digital assistant, or to a printer or display. Control continues to step S295, where the process ends.

An exemplary CYK algorithm for the membership problem is as follows:

Let the input string be a sequence of n letters $\alpha_1 \ldots \alpha_n$.
Let the grammar contain r terminal and non-terminal symbols
$R_1 \ldots R_r$, and let $R_1$ be the start symbol.
Let $e_j(a_i) = \text{Prob}(R_j \to a_i)$
Let $t_v(i,j) = \text{Prob}(R_v \to R_i R_j)$
Let G[n,n,r] be an array of reals.
Initialization step:
For each i=1 to n, j=1 to r
$G[i,i,j] = \log(e_j(a_i))$
Iteration Step:
For each i=1 to n−1, j=i+1 to n, v=1 to r
$G[i,j,v] = \max_{x,y} \max_{k=1,\ldots,j-1} G[I,k,y] + G[k+1,j,z] + \log t_v(y,z)$ G[1,n,1] is the log probability of the maximum probability parse The maximum probability parse is also called the maximum likelihood parse. It is simple to extend the above algorithm to not only determine the most probable parse of a sentence, but to also construct a parse tree, by storing parse tree nodes as elements of the array, along side of the log probabilities. Since the grammars being recognized can be ambiguous, it is necessary to store a list of nodes.

As noted above, the sequence of line tokens representative of a document received by the system 100 is parsed with the grammars of a number of predefined document types or genres in step S260. Exemplary document genres include a business card, a business letter, a memorandum, a resume, an invoice, etc.

Figure 3:
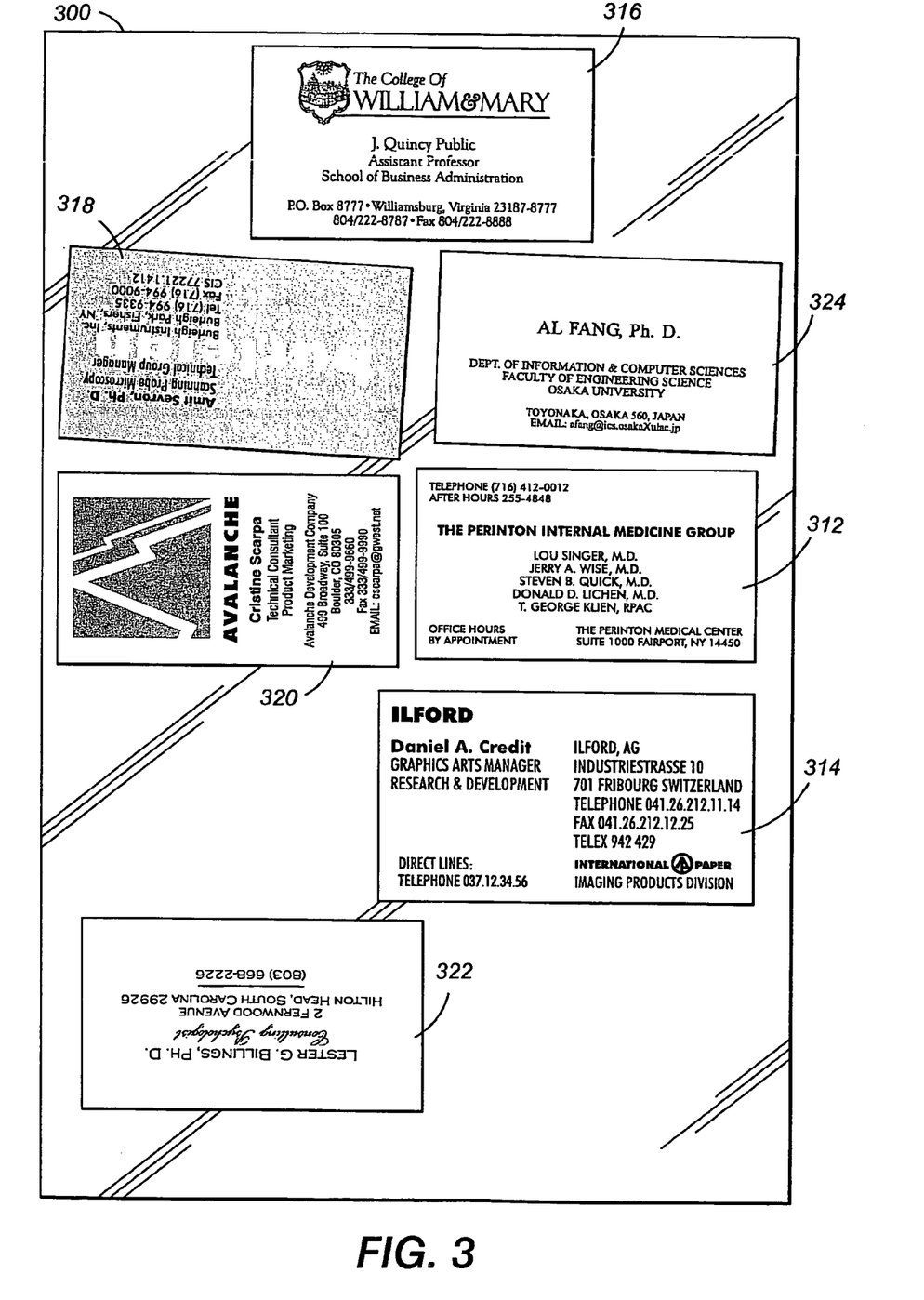
FIG. 3 illustrates a plurality of exemplary business cards located upon a platen area of a scanner.

Exemplary business card layouts are illustrated in FIG. 3. The layout of a business card may be modeled as a stochastic context-free grammar where terminal symbols correspond to lines of text with font size information and separators. Non-terminals are labels for the functions of the text, e.g., names, organizations, etc. Thus, a grammar must be established which defines a set of terminal symbols that could appear in a business card. Each terminal in the grammar represents a single line of text from the card.

As illustrated in Table 1, a business card document genre may include lines of text each labeled, for example, by one of the following terminal labels (a_line, an_line, emph_line, huge_line, office_line, fax_line, mobile_line, pager_line, other_line, email_line, and url_line) according to the line's content.

TABLE 1

| Terminal Label | Contents |
| --- | --- |
| a_line | alphabetic line |
| an_line | alpha-numeric line |
| emph_line | large-font or bold lines |
| huge_line | Huge font-line |
| office_line | line with office/main phone number |
| fax_line | line with fax number |
| mobile_line | line with mobile phone number |
| pager_line | line with pager number |
| other_line | line with any other phone number |
| email_line | line with an email address |
| url_line | line with a url |

In addition, a terminal separator is used between two lines which are spatially apart or which belong to different labels. A terminal epsilon (eps) or null symbol can also be used to help simplify the grammar. Examples of non-terminal labels (NAME_AFFILIATION, ID_BLOCK, ORG_NAME, ORG_ BLOCK, ADDRESS_BLOCK, PHONE_BLOCK, INTERNET_BLOCK, COMMENT_BLOCK, etc., are used to represent various regions of a business card, as illustrated in Table 2. Other non-terminals can further abstract multiple terminals into a single group.

TABLE 2

| Non-terminal Label | Contents |
| --- | --- |
| (NAME_AFFILIATION, ID_BLOCK) | Name and title of the person |
| (ORG_NAME, ORG_BLOCK) | Name of the organization |
| (ADDRESS_BLOCK) | Address of the person/office |
| (PHONE_BLOCK) | Phone numbers |
| (EMAIL_BLOCK) | Email address |
| (URL_BLOCK) | Internet URL address |
| (COMMENT_BLOCK) | Lines not fitting the other non-terminals |

The grammar rules are directed by two important, but conflicting objectives. First, simplicity of the grammar helps reduce the number of parameters or probabilities to be estimated. A second objective involves the ability of the grammar to model spatial order of the different regions of interest such as, for example, name, address, and organization name. Even though it is possible to describe a two-dimensional spatial distribution using stochastic context-free grammars, the business cards may be modeled as a linear sequence of regions.

The blocks in a business card may be ordered linearly by scanning them from left to right; top to bottom. It is noted that it may not be practical to use a grammar that generates each of the individual orderings as there may be thousands to estimate.

Orderings may be simplified as follows. Every business card is assumed to contain a single ID_BLOCK and a single ADDRESS_BLOCK. Three sets of blocks are additionally defined by their position on the business card relative to the ID_BLOCK and ADDRESS_BLOCK.

Blocks found to occur prior to the location of both the ID_BLOCK and the ADDRESS_BLOCK are called S_BLOCKS (start blocks). Blocks, which are found to occur in between location of the ID_BLOCK and the ADDRESS_BLOCK, are called M_BLOCKS (middle blocks). Blocks, which are found to occur after both the ID_BLOCK and the ADDRESS_BLOCK, are called E_BLOCKS (end blocks).

Further, the grammar may also model the probability that each block, such as COMMENT_BLOCK, PHONE_BLOCK, etc., belongs to one of S_BLOCKS, M_BLOCKS, or E_BLOCKS. It also considers the two possible orderings of ID_BLOCK and ADDRESS_BLOCK.

The following list contains a list of possible rules for a grammar of an exemplary business card document genre. It is noted that terminal symbols are named using lower-case alphabets and non-terminal symbols are named using upper-case. The number preceding each production denotes the probability of the production being applied in the derivation of a terminal string when the non-terminal on the left hand side is encountered.

0.80 CARD -> S_BLOCKS separator ID BLOCK M_BLOCKS separator ADDRESS_BLOCK E_BLOCKS
0.20 CARD -> S_BLOCKS separator ADDRESS BLOCK M_BLOCKS separator ID_BLOCK E_BLOCKS
0.66 S_BLOCKS -> separator S_BLOCK S_BLOCKS
0.34 S_BLOCKS -> eps
0.40 S_BLOCK -> ORG BLOCK
0.25 S_BLOCK -> PHONE BLOCK
0.25 S_BLOCK -> INTERNET BLOCK
0.10 S_BLOCK -> COMMENT BLOCK
0.20 M_BLOCKS -> separator M_BLOCK M_BLOCKS
0.80 M_BLOCKS -> eps
0.10 M_BLOCK -> ORG BLOCK
0.35 M_BLOCK -> PHONE BLOCK
0.35 M_BLOCK -> INTERNET BLOCK
0.20 M_BLOCK -> COMMENT BLOCK
0.60 E_BLOCKS -> separator E_BLOCK E_BLOCKS
0.40 E_BLOCKS -> eps
0.10 E_BLOCK -> ORG BLOCK
0.40 E_BLOCK -> PHONE BLOCK
0.40 E_BLOCK -> INTERNET BLOCK
0.10 E_BLOCK -> COMMENT_BLOCK
0.30 ID_BLOCK -> NAME
0.70 ID_BLOCK -> NAME AFFILIATION
0.35 ADDRESS_BLOCK -> ADDRESS NAME ADDRESS_BLOCK
0.35 ADDRESS_BLOCK -> an_line ADDRESS_BLOCK
0.15 ADDRESS_BLOCK -> an_line
0.15 ADDRESS_BLOCK -> a_line
0.50 ADDRESS_NAME -> emph_line -continued

```
0.50 ADDRESS_NAME -> a_line
0.80 ORG_NAME -> huge_line
0.20 ORG_NAME -> emph_line
0.40 ORG_BLOCK -> ORG_NAME
0.20 ORG_BLOCK -> ORG_NAME ORG_NAME
0.20 ORG_BLOCK -> ORG_NAME ORG_NAME ORG_NAME
0.20 ORG_BLOCK -> ORG_NAME A_LINES
0.50 PHONE_BLOCK -> PHONE_LINE PHONE_BLOCK
0.50 PHONE_BLOCK -> PHONE_LINE
0.25 PHONE_LINE -> office_line
0.25 PHONE_LINE -> fax_line
0.20 PHONE_LINE -> mobile_line
0.20 PHONE_LINE -> other_line
0.10 PHONE_LINE -> pager_line
0.30 INTERNET_BLOCK -> email_url
0.30 INTERNET_BLOCK -> url_email
0.30 INTERNET_BLOCK -> email
0.10 INTERNET_BLOCK -> url
1.00 NAME -> emph_line
1.00 AFFILIATION -> A_LINES
0.60 A_LINES -> a_line A_LINES
0.40 A_LINES -> a_line
0.65 COMMENT_BLOCK -> a_line
0.15 COMMENT_BLOCK -> an_line
0.10 COMMENT_BLOCK -> COMMENT_BLOCK a_line
0.10 COMMENT_BLOCK -> COMMENT_BLOCK an_line
```

The font size of each of the characters may be estimated, and this information made available in a data structure. The font size information is converted to terminal symbols such as: a_line, emph_line, and huge_line. It can be difficult to classify text of a particular size as either an emph_line or a huge_line so a probability distribution of font sizes, corresponding to each of: a_line, emph_line, and huge_line, is used.

To cope with the variability in font sizes across differing business cards, font sizes within each card can be normalized to have a value ranging between 0 and 1. As such, each of a_line, emph_line, and hugh_line assume a Gaussian distribution in this range. These probabilities are then incorporated into the computation of the most probable parse using the CYK algorithm.

Figure 4:
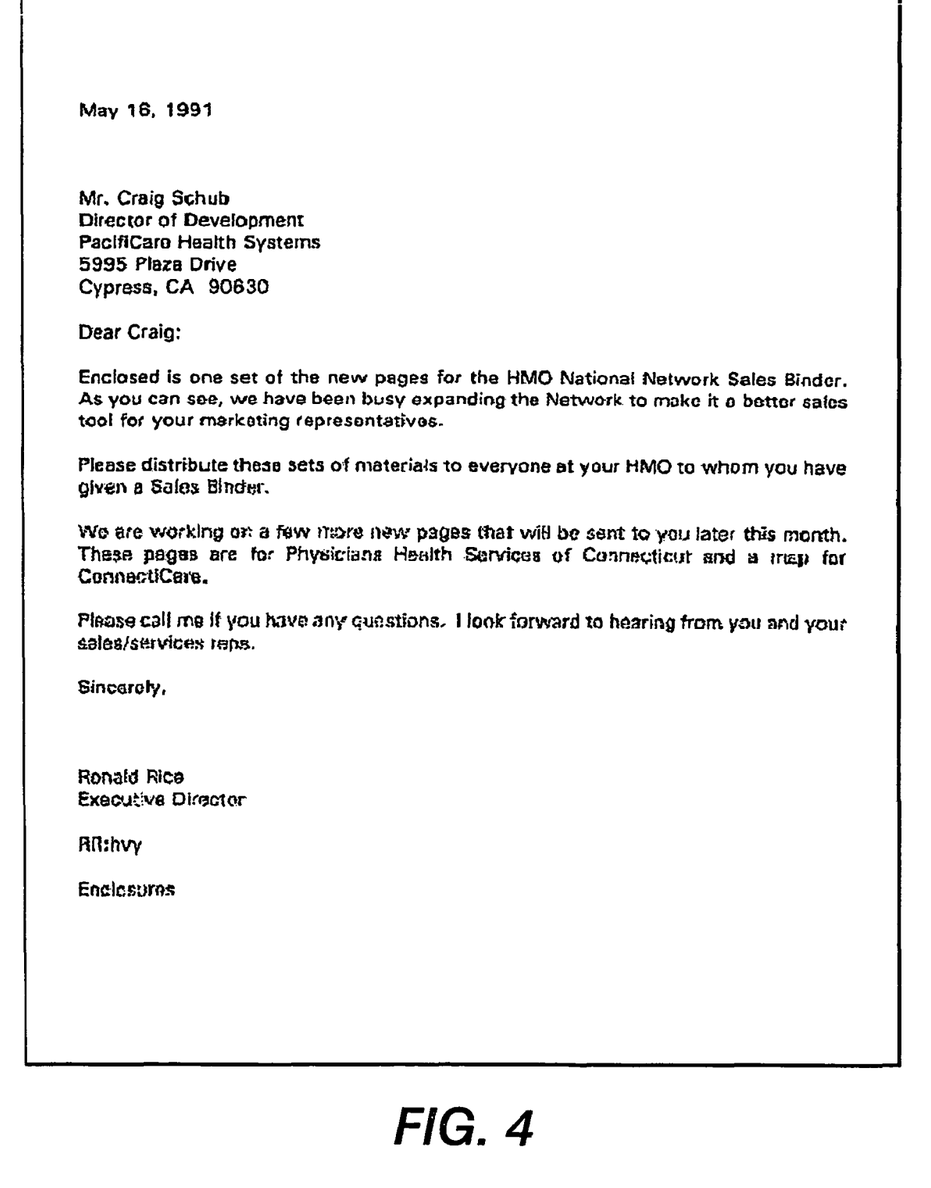
FIG. 4 illustrates a typical business letter.

Another exemplary document genre is a business letter, such as that shown in FIG. 4. A stochastic context-free grammar may be used to model the type and sequence of text lines within functional blocks or regions (e.g., Dateline, InsideAddress) and the sequence of regions in a business letter (e.g., An Opening is followed by body text). Stochastic context free grammars have probabilities associated with their productions. To be well-defined, the probabilities of all rules associated with each non-terminal must sum to one.

Referring again to the process described with respect to FIG. 2, in steps S240 and S250, blocks of text lines, or regions, of business document may be classified based on the text content and sequential layout of text lines. The regions may be modeled using probabilistic classification of text lines and stochastic context-free grammar modeling of region sequencing.

Figure 5:
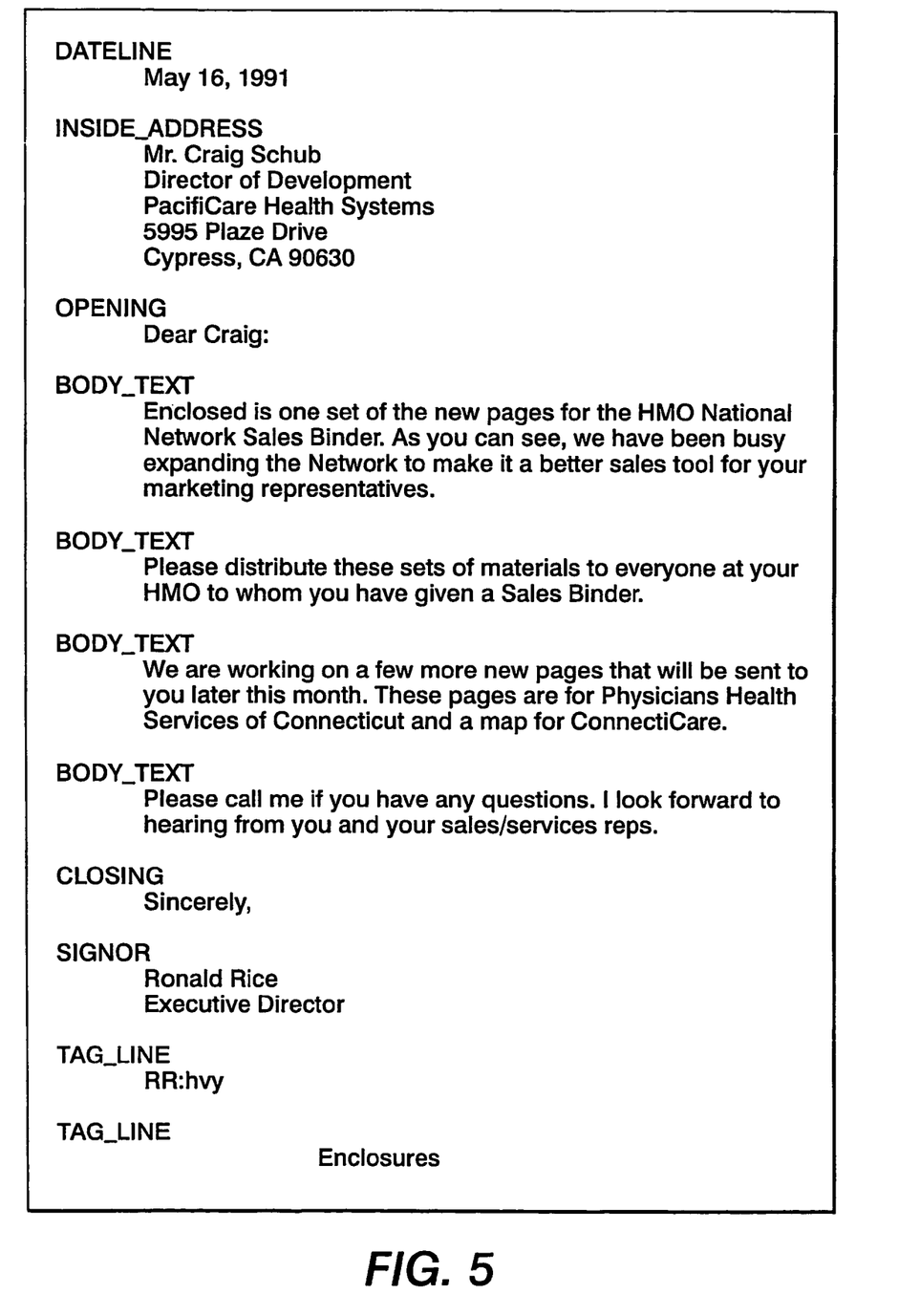
FIG. 5 illustrates the recognized fields of the business letter of FIG. 4.

For the purposes of recognition, the following business letter region classes may be used: "Dateline," "Signor" (Signor's identification), "InsideAddress" (addressee information), "Letterhead" (Name, Titles of sender), "Opening," "LetterheadContactInformation" (contact information of sending organization), "BodyText," "Closing," "TagLine" (this includes all labeled regions, e.g. To:, P.S., Enclosure, cc:, identification line, etc.), and "Other" (anything else). FIG. 5 illustrates the recognized fields of the business letter of FIG. 4.

With the exception of identification lines which have a fairly fixed format, the classification, "TagLines," is defined by a region having a tag at the beginning of the region, followed by what for now is considered to be free text. It is easier to model these region types (i.e., regions having a tag at the beginning) together rather than separately, as increasing the number of region classifications increases the number of parameters that must be trained in the stochastic context-free grammar. Given how inconsistently the regions appear and their common structure, the regions may be grouped. Also, the letterhead regions may be separated which simply name or describe an organization in text from letterhead 'contact' regions, which contain contact information for the organization of the sender. The text content of these regions is quite different, so the regions are treated as separate classes.

The input to the business letter recognition system may be optical character recognition output produced from a scan of a hard copy business letter. In the optical character recognition output, both words and text lines have been segmented. Graphics are removed from the optical character recognition output. The text line segmentation is refined. If a significant gap is located in a vertical projection and text lines are intersected by this gap, gaps greater than a threshold size are cut in half to produce two columns of text lines.

The input to the business document genre classification system 100 may be an electronic rich text format document that has been generated by conventional methods or means. As described above, the electronic rich text format document may be parsed/segmented to obtain to produce lines of text, position information, text size information, and line separators. As in the above implementation, the parsing/segmentation process may be refined such that if a significant gap is located in a vertical projection and text lines are intersected by this gap, gaps greater than a threshold size are cut in half to produce two columns of text lines.

After text lines segmentation has been refined in both implementations, page regions are segmented using a variant of Nagy and Seth's XY-cut algorithm (G. Nagy and S. Seth. Hierarchical representation of optically scanned documents. In Proc. Int'l Conf. Pattern Recognition, pages 437-349, 1984).

The modified XY-cut algorithm may be two parameters, one defining the size of significant gaps in the horizontal direction (column separators) and another defining significant gaps in the vertical direction (row/paragraph separators). Bounding boxes are projected onto one axis. The axis is cut at gaps with a width greater than or equal to the threshold corresponding to the projection direction. The modified XY-cut algorithm is then applied, recursively, in any new sub regions produced after cutting. This second application of the modified XY-cut algorithm projects onto and then cuts along the opposite axis. The modified XY-cut algorithm terminates when no further cuts can be made in either the X or Y direction in a region.

In one implementation, cutting begins in the vertical direction so as to cut columns first. The tree resulting from the modified XY-cut algorithm is linearized using a depth-first traversal. This results in a top-down, left-to-right ordering of regions in the output.

The output is an array of objects including text lines, separators (representing cuts) and "region" objects, which have the bounding box of a region associated with them. Labeled cuts are explicitly made, where the direction of cutting is indicated. On the other hand, all cuts may be treated as the same type. The effect is a linearized layout of the business letter page regions.

After regions have been segmented and linearly laid out, text lines are classified in two ways. First, a lexical type is assigned based on an ordered set of regular expressions corresponding to the defined lexical types. Six text line lexical types may be used: date, open/close, contact, tagged_line, name, and other (all other patterns). Additionally, "separator" is used as a token to represesent significant spaces between blocks of lines.

Lexical types may be further refined using probabilistic classification. For example, region objects of type 'rlabel' may be subdivided into their specific region types, so that region objects may be divided into 'rlabelBODY_TEXT', 'rlabelINSIDE_ADDRESS', etc. types. This probabilistic classification is generally the method described above with respect to the business card recognition system, in which alphanumeric lines were divided into three classes based on font size.

It is noted that, for simplicity, all feature distributions can be univariate and normal. Region objects can be classified by the width of their associated regions in characters (e.g. by widest text line), and 'other' tokens can be classified by the ratio of alphabetic characters to the length of a text line in characters.

As explained previously, the maximum-likelihood derivation of an input string may be computed using a variant of the Cocke-Younger-Kasami (CYK) parsing algorithm. The resulting derivation and probability are equivalent to the maximum inside probability of the grammar start symbol, the most probable parse tree given a stochastic context-free grammar. The output of the CYK parse is the probability and parse tree for the maximum likelihood derivation. In the tree, the region types assigned to text line sequences are represented as non-terminals in the tree. A list of recognized regions is produced by linearizing sub-trees rooted at non-terminals corresponding to region types. The resulting list of regions contains the assigned region type and text lines for each segmented region in the input.

It is noted that the linearized ordering of regions may have a great deal of variation both before and after the body text of a business letter. To accommodate this variation, the stochastic context-free grammar describes a model where a non-empty set of regions are at the top of the letter, followed by body text regions, and then a non-empty set of regions at the bottom of the letter. The regions that can appear above the body text and below differ, in that the dateline, opening and inside address of a letter always precede body text, while the closing and signor identification always follow body text.

The following list contains a list of possible tokens and rules for an exemplary grammar of a business letter document genre. It is noted that terminal symbols are named using lower-case alphabets and non-terminal symbols are named using upper-case. In the grammar section, the number preceding each production denotes the probability of the production being applied in the derivation of a terminal string when the non-terminal on the left hand side is encountered.

```
Tokens
    separator
        "separator"
        "row_cut.*"
        "column_cut.*"
    rlabel
        "\[REGION\]"
    date
        "[[:alpha:]]+[[:space:]]+[[:digit:]]{1,2}[[:punct:]][[:space:]]*[[:digit:]]{2,4}"
        "[[:alpha:]]+\s*[[:digit:]]{1,2},\s*[[:digit:]]{2,4}"
        "[[:digit:]]{2,2}[[:punct:]]+[[:digit:]]{2,2}[[:punct:]]+[[:digit:]]{2,4}"
    open_close
        "Sincerely[[:punct:]]+"
        "Yours\s[t,T]ruly[[:punct:]]+"
        "Dear\s.*"
        ".*,"
        ".*:"
    contact
        "P\.O\.s+Box.*"
        "P\.O\..*"
        "PO\sBox.*"
        "PO\sBOX.*"
        "Post\s+Office\s+Box\s+\d+"
        "\d+.+AVE"
        "\d+.+STREET"
        "\d+.+Ave"
        "\d+.+Street"
        "\d+.+BLVD"
        "\d+.+Blvd"
        "\d+.+Rd[[:punct:]]?"
        "\d+.+RD[[:punct:]]?"
        "\d+.+Road"
        "\d+.+ROAD"
        "\d+.+Floor"
        "\d+.+FLOOR"
        "\d+.+BUILDING"
        "\d+.+Building"
        "\d+.+Drive"
        "\d+.+DRIVE"
        "\d+.+Park"
        "\d+.+Parkway"
        "\d+.+PARKWAY"
        ".*Suite\s\d+"
```

-continued

```
"[[:alpha:][:space:][:punct:]]+(\d){5,5}"
"[[:alpha:][:space:][:punct:]]+(\d){5,5}[[:punct:][:space:]]+[[:digit:]]+[[:space:]]*(USA)?"
"\d+.*[[:alpha:][:space:][:punct:]]+(\d){5,5}[[:punct:][:space:]]+[[:digit:]]+[[:space:]]*(USA)?"
"\d+.*(\d){5,5}"
"Box\s.*"
"BOX\s.*"
"[[:alpha:][:digit:]]+@([[:alpha:][:digit:]]+\.)+[[:alpha:][:digit:]]+"
"email.*"
"e-mail.*"
"EMAIL.*"
"Email*"
"E-MAIL.*"
"www\.[[:alpha:][:punct:][:digit:]]+"
"http:[[:alpha:][:punct:][:digit:]]+"
"\([[:digit:]]{3,3}\)[[:digit:][:space:][:punct:]]+"
"\([[:digit:][:space:]]+\)[[:digit:][:space:][:punct:]]+"
"[[:digit:]]{3,3}[[:punct:][:space:]]*[:digit:]{3,3}[[:space:][:punct:]]+[:digit:]+"
"Telephone.*"
"TELEPHONE.*"
"Fax.*"
"FAX.*"
".*\s*ext[[:punct:]]?[[:space:]]*\d+"
".*\s*EXT[[:punct:]]?[[:space:]]*\d+"
"1[[:digit:][:space:][:punct:]]{6,}"
"Phone.*"
"Manager.*"
".*Manager"
"President.*"
"Chief.*"
".*Director"
".*Coordinator"
"Coordinator.*"
"Director[[:punct:]]+.*"
"Editor.*"
".*Editor"
".*INC[[:punct:]]+"
".*\s*Inc"
".*\s*INC"
".*\sINCORPORATED"
".*\sIncorporated"
".*\sLTD[[:punct:]]*"
".*\sLimited"
".*\sUniversity"
".*\sUNIVERSITY"
"University.*"
"UNIVERSITY.*"
".*\sCorp[[:punct:]]*"
".*\sCORP[[:punct:]]*"
".*\sCorporation"
".*\sCORPORATION"
"Department.*"
"ASSOCIATION.*"
"Association.*"
".*\sAssociation"
".*\sASSOCIATION"
"College.*"
".*\sCollege"
tagged_line
   "[[:alpha:]]+[:space:]*:.*"
   "[[:upper:][:space:]]+:.*"
   ".*([:space:]*[:alpha:]{2,3}[:space:]*:)+[:space:]*[:alpha:]{2,3}.*"
   "([[:alpha:]]{2,3}[:space:]*[:./])+[[:space:]]*[[:alpha:]]{2,3}"
   "cc:.*"
   "CC:.*"
   "From:.*"
   "FROM:.*"
   "To:.*"
   "TO:.*"
   "Attention:.*"
   "ATTENTION:.*"
   "Attn:.*"
   "ATTN:.*"
   "P\.S\..*"
   "PS.*"
   "Enclosure.*"
   "Encl[[:punct:]]+.*"
   "re:.*"
   "RE:.*"
   "Re:.*"
```

-continued

```
name
    "Dr\..*"
    "Mr\..*"
    "Mrs\..*"
    "Ms\..*"
    "[[:alpha:]]+[[:space:]]+([[:alpha:]][[:punct:]][[:space:]]*)?[[:alpha:]]+"
other_text
    ".*"
End Tokens
```

| | | Grammar |
|---|---|---|
| 0: | 0.98774 | S -> TOP_SEQ NT002 |
| 1: | 0.78703 | TOP_SEQ -> TOP TOP_SEQ |
| 2: | 0.76172 | BOTTOM_SEQ -> BOTTOM BOTTOM_SEQ |
| 3: | 0.10738 | TOP -> / DATELINE |
| 4: | 0.07347 | | / INSIDE_ADDRESS |
| 5: | 0.16787 | | / OPENING |
| 6: | 0.07234 | | / LETTERHEAD |
| 7: | 0.06871 | | / LETTERHEAD_CONTACT |
| 8: | 0.49597 | | / OTHER_REGION |
| 9: | 0.01426 | | / TAG_LINE |
| 10: | 0.14101 | BOTTOM -> / CLOSING |
| 11: | 0.06521 | | /SIGNOR |
| 12: | 0.18704 | | /LETTERHEAD |
| 13: | 0.03934 | | / LETTERHEAD_CONTACT |
| 14: | 0.45733 | | / OTHER_REGION |
| 15: | 0.11007 | | / TAG_LINE |
| 16: | 0.65018 | BODY -> / NT003 |
| 17: | 0.34982 | | /BODY_TEXT |
| 18: | 0.99999 | / -> SEPARATOR RLABEL |
| 19: | 0.00001 | | SEPARATOR / |
| 20: | 1.00000 | *DATELINE -> date |
| 21: | 0.99351 | *INSIDE_ADDRESS -> NAME CONTACT_SEQ |
| 22: | 0.00649 | | OTHER CONTACT_SEQ |
| 23: | 1.00000 | *OPENING -> open_close |
| 24: | 0.71867 | *BODY_TEXT -> OTHER BODY_TEXT |
| 25: | 0.28054 | | other_text |
| 26: | 0.00001 | | TAG_LINE BODY_TEXT |
| 27: | 0.00021 | | tagged_line |
| 28: | 0.00001 | | contact |
| 29: | 0.00056 | | CONTACT BODY_TEXT |
| 30: | 0.95469 | *CLOSING -> open_close |
| 31: | 0.00001 | | OPEN_CLOSE NAME |
| 32: | 0.04530 | | OPEN_CLOSE OTHER |
| 33: | 0.06320 | *SIGNOR -> name |
| 34: | 0.93516 | | NAME CONTACT_SEQ |
| 35: | 0.00163 | | contact |
| 36: | 0.00001 | | CONTACT CONTACT_SEQ |
| 37: | 0.54621 | *LETTERHEAD -> OTHER LETTERHEAD |
| 38: | 0.45379 | | other_text |
| 39: | 0.27323 | *LETTERHEAD_CONTACT -> CONTACT CONTACT_SEQ |
| 40: | 0.72676 | | OTHER CONTACT_SEQ |
| 41: | 0.00001 | | contact |
| 42: | 0.69442 | *TAG_LINE -> tagged_line |
| 43: | 0.30558 | | TAGGED_LINE OTHER_REGION |
| 44: | 0.01084 | *OTHER_REGION -> TAGGED_LINE OTHER_REGION |
| 45: | 0.40018 | | OTHER OTHER_REGION |
| 46: | 0.03955 | | CONTACT OTHER_REGION |
| 47: | 0.05118 | | OPEN_CLOSE OTHER_REGION |
| 48: | 0.00001 | | DATE OTHER_REGION |
| 49: | 0.06137 | | NAME OTHER_REGION |
| 50: | 0.00816 | | tagged_line |
| 51: | 0.31004 | | other_text |
| 52: | 0.05332 | | contact |
| 53: | 0.02754 | | open_close |
| 54: | 0.00065 | | date |
| 55: | 0.03717 | | name |
| 56: | 0.25949 | CONTACT_SEQ -> CONTACT CONTACT_SEQ |
| 57: | 0.34269 | | contact |
| 58: | 0.24990 | | OTHER CONTACT_SEQ |
| 59: | 0.14792 | | other_text |
| 60: | 1.00000 | SEPARATOR -> separator |
| 61: | 1.00000 | RLABEL -> rlabel |
| 62: | 1.00000 | OTHER -> other_text |
| 63: | 1.00000 | OPEN_CLOSE -> open_close |
| 64: | 1.00000 | TAGGED_LINE -> tagged_line |
| 65: | 1.00000 | CONTACT -> contact |
| 66: | 1.00000 | DATE -> date |
| 67: | 1.00000 | NAME -> name |
| 68: | 1.00000 | S -> TOP NT002 |
| 69: | 0.21297 | TOP_SEQ -> TOP TOP |
| 70: | 0.01226 | S -> TOP_SEQ NT004 |
| 71: | 0.23828 | BOTTOM_SEQ -> BOTTOM BOTTOM |
| 72: | 1.00000 | S -> TOP NT004 |
| 73: | 1.00000 | NT002 -> BODY BOTTOM_SEQ |
| 74: | 1.00000 | NT003 -> BODY_TEXT BODY |
| 75: | 1.00000 | NT004 -> BODY BOTTOM |

As mentioned above, a business document may be input to the system 100 via a scan of a hardcopy document, a fax of a hardcopy document, or an electronic document, for example, a Word file, an Excel file, an Adobe file, etc. The inputted document may then be converted to a rich text format document for processing by the system 100, for example, parsing, tokenizing, classification, and routing.

Regarding the receipt of a scanned business document by the system 100 in step S210, one or more business cards may be placed on a platen of a digital scanner, as illustrated in FIG. 3. As shown, a platen 300 of a digital scanner contains thereon a plurality of business cards 312, 314, 316, 318, 320, 322, 324 in preparation for digital scanning. The business cards 312, 314, 316, 318, 320, 322, 324 may be placed in any orientation on the platen 300 because each business card 312, 314, 316, 318, 320, 322, 324 will be segmented so as to create separate records of information, as will be discussed in more detail below. The platen 300, with the business cards 312, 314, 316, 318, 320, 322, 324 thereon, may be scanned to generate a digital bitmap representing the scanned platen area.

The digital bitmap may be sent to the network server 140 or the personal computer 130, assuming that the digital scanner is a network citizen, depending on which device capable of performing the various functions discussed above to convert the bitmap to useable text data and to parse out this text data into coherent and meaningful fields. According to various aspects, the digital scanner may be part of a multi-function device that has a processor capable of performing the various functions discussed above to convert the bitmap to useable text data and to parse out this text data into coherent and meaningful fields.

For situations where a plurality of business cards are scanned simultaneously on the platen 300, the digital bitmap may be received by a business card recognition system or processor. The business card recognition system or processor may include a business card segmentation subsystem or module that segments or parses out each individual business card from the overall digital bitmap into individual business card digital bitmaps. The business card segmentation subsystem or module may include an image processing module to process the bitmap. Examples of such processes are anti-aliasing, edge enhancement, deskewing, etc.

The business card segmentation subsystem or module may receive the digital bitmap generated by scanning the digital scanner platen 300 and automatically identify at least the position, shape and orientation angle of each object (e.g., business cards 312, 314, 316, 318, 320, 322, 324). Initially, the object(s) (e.g., business cards 312, 314, 316, 318, 320, 322, 324) within the image is located and boundaries of the object(s) (e.g., business cards 312, 314, 316, 318, 320, 322, 324) are generally identified. Once the object(s) (e.g., business cards 312, 314, 316, 318, 320, 322, 324) is/are located, the shape of the object may be modeled. Having located the object and modeled its shape, a structured image, or similar digital document format representing the image and the object therein can be created. The structured image may include data representing not only the image data itself, but data representing the location, shape, or orientation of the object, or some combination thereof.

The object's location may be realized by first identifying the background region of the input image, characterizing the background region, and then, using the characteristic of the background region as a seed, identifying all the pixels representing the background region with an adaptive seed fill algorithm. Background pixels are pixels not associated with any objects (e.g., business cards 312, 314, 316, 318, 320, 322, 324) or more simply, background pixels are pixels representative of those regions lying outside of the objects (e.g., business cards 312, 314, 316, 318, 320, 322, 324) the values of which are controlled by the "background" against which the objects are placed during scanning (e.g., the underside of the platen cover).

Having identified background pixels and created a representation of the object boundaries, noisy edges can be optionally smoothed, by the IP module, using, for example, morphological filtering.

Once the object has been located, the next general step is to model the shape of the object. For purposes of simplicity, the following description will treat rectangular-shaped objects, however, it will be appreciated that the description is extensible to other polygons and even to shapes having portions thereof represented by curves (e.g., circular or elliptical objects).

The location of the object is a set of bounding pixels or a set of edge traces may be organized in the form of a linked list. These pixels or traces can be used to extract the object, but orientation is not yet determined. To improve the quality of the object extraction, the object traces are fitted to a model shape. Orientation information and other characteristics of the object may then be extracted from the fitted parameters.

A more detailed discussion of the business card segmentation process is set forth in U.S. Pat. No. 6,704,456, entitled "Automatic Image Segmentation In The Presence Of Severe Background Bleeding." The entire content of U.S. Pat. No. 6,704,456 is hereby incorporated by reference.

Another discussion of an object segmentation process that may be readily used is set forth in U.S. Pat. No. 6,738,154, entitled "Locating the Position and Orientation of Multiple Objects with a Smart Platen." The entire content of U.S. Pat. No. 6,738,154 is hereby incorporated by reference.

After each object, business cards 312, 314, 316, 318, 320, 322, 324, has been extracted, each individual business card object, a business card bitmap, may be directed to the system 100 for electronic document genre classification. Each business card bitmap may then be converted to a rich text format via processing by, for example, an optical character recognition process. The optical character recognition process may be any conventional optical character recognition process. The optical character recognition process may convert each business card bitmap into a business record of text data, which may then be parsed, tokenized, classified, and routed, as described above.

Once it is determined that a document received by the system 100 is of the business card genre, labeled fields of text data may be output to an electronic business card generation system or module. The electronic business card generation subsystem or module may convert the labeled fields of text data into a text file that can be readily used by various business contact management applications to import the desired business information in a useable format. For example, the electronic business card generation subsystem or module may generate a text file that can be imported into a conventional e-mail application or electronic address book.

According to various embodiments, once it is determined that a document is of the business card genre, the outputted text file can be e-mailed to a user for importing into the user's appropriate applications or databases or electronically transferred to a database residing on the network 135, 175, for example, on the server 150, the personal computer 160, and/or the personal digital assistant 170.

In summary, the scanned images may be routed to a network server where the scanned image is segmented into the images of individual business cards. Each scanned business card is then run through an application which interprets its contents, i.e. determines what's name, what's email, etc. The interpreted entities are then used to create text file for use in a conventional contact management application or electronic address book. Examples of such text file may have a vcf or rix extension. The text file can be then e-mailed to the user to be automatically saved as an electronic entity using the normal process of a conventional email client.

A user meets a set of potential customers in a sales show and obtains their business cards. The user does not want to enter the information on the business cards into the user's handheld's contact list or address book manually; as it just takes too much time. The user can place the business cards onto the platen of a digital scanner and selects a scanning task related to generating text files from the scanned bitmap and e-mailing the text files to a selected address. The user upon selecting this task, entering the proper e-mail address, and hitting a start button enables the automatic conversion of the information upon the business cards into text files that can be forwarded to the user.

In one scenario, the user receives an email note on his handheld or his laptop or personal computer. The subject line of the e-mail may read: "Your New Contacts." Once the user opens the e-mail, the user notices a set of attachments (text files), one corresponding to each individual whose business card the user scanned. The user can now choose to accept each of the attachments into his contact list.

In another scenario, the user receives an e-mail note on his handheld. The subject line of the email may read: "Your New Contacts have been added to your Exchange Contact List." Unlike the scenario above, there are no attachments in this e-mail note because the text files have already been automatically added to a predetermined database of contact information.

In summary, a networked scanner connected to a computer server executes processes to segment the images of the business cards into individual cards, processes each card with an optical character recognition system that outputs characters in the form of line with positions font sizes, a process that produces lines of text with attributes according to stochastic context-free grammar, a parsing system that assigns non-terminal labels to blocks of lines, and a module that converts non-terminal labels to a database entry.

As noted above, in mailroom operations, many businesses have attempted to "truncate the paper" by scanning documents as the documents enter the business and route them electronically. This is faster and cheaper than routing hardcopy documents. To route efficiently, it may be required that fields of business letters be recognized and labeled. For example, one usually requires the recipient (addressee) and sender (addressor) information to be known so that the recipient's email address can be looked up in a database and the scanned document sent. Currently, this process of acquiring the recipient (addressee) and sender (addressor) information and e-mailing the scanned document is done manually.

For example, a multifunction device may scan a business letter to a repository, process the business letter with an optical character recognition system, use the provided layout information to segment the recognized lines of text into a linear sequence of regions and separators, identify tokens for each line using classifiers and for each separator, parsing the token sequence into "non-terminal" symbols comprising region labels, using the recipient field to route the scanned document.

As noted above, in many business workflow environments, it is cheaper and faster to process electronic documents. Paper documents are eliminated at the mailroom by scanning mail and routing the scanned image to the recipient by email. In addition to scanning a document to get the raw image, it is necessary to extract "metadata" associated with the document. For business letters, appropriate metadata includes recipient and sender. Also, the body of letter may be useful to summarize the content of the letter.

After an individual scans a business letter, the region-labeled text of the letter is sent electronically to a desired destination (e.g. as email, or to a remote disk). The optical character recognition output and recognized metadata (region types) can be then used for automated indexing and retrieval of letters, routing, and producing editable electronic versions of the original document.

In a general sense, the user scans a business letter at a multifunction device, deposits the scanned image in a file system, processes the image with an optical character recognition process, parses the file and outputs ASCII text and layout information, labels the text according to a document model instantiated by a stochastic context-free grammar, and process the labeled data for routing, storing, or extraction routines. Regions of a business letter (e.g., blocks of text) may be classified based on the text content and sequential layout of the text lines. The regions may be modeled using probabilistic classification of text lines and stochastic context-free grammar modeling of region sequencing.

According to various aspects of the invention, an electronic document genre classification system and method may be automated and substantially error free. Moreover, an electronic document genre classification system in accordance with aspects of the invention may convert various types of business documents to a universal format, for example, a rich text format, so that the text of the documents can be parsed, tokenized, and sequenced. Furthermore, according to various aspects, an electronic document genre classification system may determine the probabilities associated with parsing the processed electronic document with a number of predefined document grammars to classify the genre of the electronic document and route the document based on the determined genre.

While various examples and embodiments have been shown and described, it will be appreciated by those skilled in the art that the spirit and scope of the descriptions are not limited to the specific description and drawings herein, but extend to various modifications and changes.

What is claimed is:

1. A system for classifying a genre of an electronic document, comprising:
a network processor configured to receive an electronic document; convert the electronic document to rich text format (RTF) using optical character recognition technology; parse the RTF document into lines of text ordered from top to bottom and left to right, and into line separators based on space between blocks of the lines of text; assign tokens to each of the lines of text based on content of the line of text and to each of the line separators; sequence the tokens; parse the tokenized document with a number of pre-defined document grammars; determine a probability for each genre corresponding to the electronic document based on the parsed tokenized document; classify the electronic document as the genre with the highest probability; and route the electronic document to at least one output device based on the genre classification.

2. The system of claim 1, wherein the at least one output device comprises one of a server, a personal computer, or a personal digital assistant.

3. The system of claim 1, further comprising a personal computer configured to send electronic documents to the network processor.

4. The system of claim 1, wherein the network processor is configured to receive the electronic document via email, ftp, or facsimile.

5. The system of claim 1, wherein the network processor is configured to parse the tokenized document with a first pre-defined document grammar representative of a business card and a second pre-defined document grammar representative of a business letter.

6. A method for classifying a genre of an electronic document, comprising:
receiving an electronic document;
converting the electronic document to rich text format (RTF) using optical character recognition technology;
parsing the RTF document into lines of text ordered from top to bottom and left to right, and into line separators based on space between blocks of the lines of text;
assigning tokens to each of the lines of text based on the content the line of text and to each of the line separators;
sequencing the tokens;
parsing the tokenized document with a number of pre-defined document grammars;
determining a probability for each genre corresponding to the electronic document based on the parsed tokenized document;
classifying the electronic document as the genre with the highest probability; and
routing the electronic document to at least one output device based on the classification.

7. The method of claim 6, wherein the output device is one of a server, a personal computer, or a personal digital assistant.

8. The method of claim 6, wherein the electronic document is received via email, ftp, or facsimile.

9. The method of claim 6, wherein the electronic document is an image file.

10. The method of claim 6, wherein the electronic document is a text file.

11. The method of claim 6, wherein said parsing the tokenized document comprises parsing the tokenized document with a first pre-defined document grammar representative of a business card and a second pre-defined document grammar representative of a business letter.

* * * * *